(12) United States Patent
Rosenberg

(10) Patent No.: US 8,990,314 B2
(45) Date of Patent: Mar. 24, 2015

(54) SYSTEM AND METHOD FOR UTILIZING INSTANT MESSAGING TO SCHEDULE CONFERENCE CALLS

(75) Inventor: Jonathan Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1585 days.

(21) Appl. No.: 12/196,418

(22) Filed: Aug. 22, 2008

(65) Prior Publication Data

US 2010/0049808 A1 Feb. 25, 2010

(51) Int. Cl.
*G06F 15/16* (2006.01)
*G06Q 10/10* (2012.01)

(52) U.S. Cl.
CPC ................. *G06Q 10/10* (2013.01)
USPC ........................................... 709/206

(58) Field of Classification Search
USPC ........................................... 709/206
See application file for complete search history.

(56) References Cited

U.S. PATENT DOCUMENTS

2005/0267975 A1\* 12/2005 Qureshi et al. ............... 709/229

\* cited by examiner

*Primary Examiner* — Shripal Khajuria
(74) *Attorney, Agent, or Firm* — P. Su

(57) ABSTRACT

In one embodiment, a method includes engaging in real-time communications using a first application, and dynamically granting permissions that enable a second participant to a tool associated with a first participant through the first application. The real-time communications involve a plurality of participants that include the first participant and the second participant. The permissions are dynamically granted using the first application.

30 Claims, 14 Drawing Sheets

SYSTEM AND METHOD FOR UTILIZING INSTANT MESSAGING TO SCHEDULE CONFERENCE CALLS

BACKGROUND OF THE INVENTION

The present invention relates generally to networking architectures.

The scheduling of conference calls enables multiple parties to converse and share information from widely disparate locations. At a scheduled time for a conference call, each invited party accesses a conference bridge, and joins the conference call.

When a conference call is to be scheduled to include a relatively large number of required or desired participants, the scheduling process may be tedious. Identifying a time slot during which substantially all of the participants are available may be time consuming. By way of example, a party who is responsible for scheduling a conference call that is to be joined by many participants may need to initiate e-mail exchanges with each participant in an effort to locate a common, available time slot during which the conference call may be scheduled. The use of e-mail exchanges, which may drag on for days, wastes valuable time, and may prove to be a drain on the productivity of involved parties, i.e., those participating in the e-mail exchanges.

Personal information manager tools, e.g., Microsoft Outlook, may provide calendaring functionality that facilitates the scheduling of conference calls. A user of calendaring functionality may maintain his or her schedule on a calendar that may be accessed by others across a network. By accessing the calendars of intended participants, a conference call scheduler may attempt to locate a common time during which each of the participants is available. However, some of the intended participants may not keep their calendars up-to-date. For example, a calendar may erroneously indicate than an intended participant is available when he or she is not actually available. If a conference call is scheduled during a time when the intended participant is not actually available, he or she may be forced to contact the conference call scheduler and request that the conference call be scheduled for a different time. As a result, the conference call scheduler may be forced to repeat the overall, inefficient, tedious process of identifying a common time that is available for all intended participants.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

According to one aspect of the present invention, a method includes engaging in real-time communications using a first application, and dynamically granting permissions that enable a second participant to access a tool associated with a first participant through the first application. The real-time communications involve a plurality of participants that include the first participant and the second participant. The permissions are dynamically granted using the first application.

Description

The ability to share calendars amongst individuals facilitates the scheduling of events, as for example appointments or meetings, by allowing each individual to view the calendars of every other individual. Enabling calendars to be shared by individuals who are engaged in real-time communications allows the individuals to efficiently schedule a future event at a time which is convenient to substantially all of the individuals, as the individuals may readily communicate with each other as necessary to identify a convenient time.

An interactive, real-time communications system such as an instant messaging (IM) application may include functionality that allows a tool such as a calendar to be shared. That is, a calendar application may effectively be integrated with an IM application. For example, an IM client on the desktop of a user may include a "share calendar" button or menu entry that allows the user to share his or her calendar with parties with whom he or she is maintaining an IM conversation. By clicking on a "share calendar" button, or selecting a "share calendar" menu entry, the user transfers his or her calendar information to everyone else in the IM conversation. Each participant in the IM conversation, including the user who shared his or her calendar, may then have access to the user's calendar and, hence, be able to identify when the user is available.

In the event that the user's calendar is not up-to-date, the user may use an IM conversation to convey up-to-date information to the other parties in the IM conversation. Hence, through the use of the IM conversation, the parties may ascertain an appropriate time for a future conference call, e.g., a time at which substantially all parties to the future conference call are available.

When substantially all participants in an IM conversation share their calendars, the participants may utilize the calendars as well as real-time IM exchanges to select a time for a future appointment or meeting, e.g., a conference call. Once a block of time for a future conference call is identified, a conference call scheduler may schedule the future conference call and, as a result, effectively mark the block of time as being associated with the future conference call. The block of time is generally marked as being set aside for the conference call on each calendar that was shared during the IM conversation.

Figure 1A:
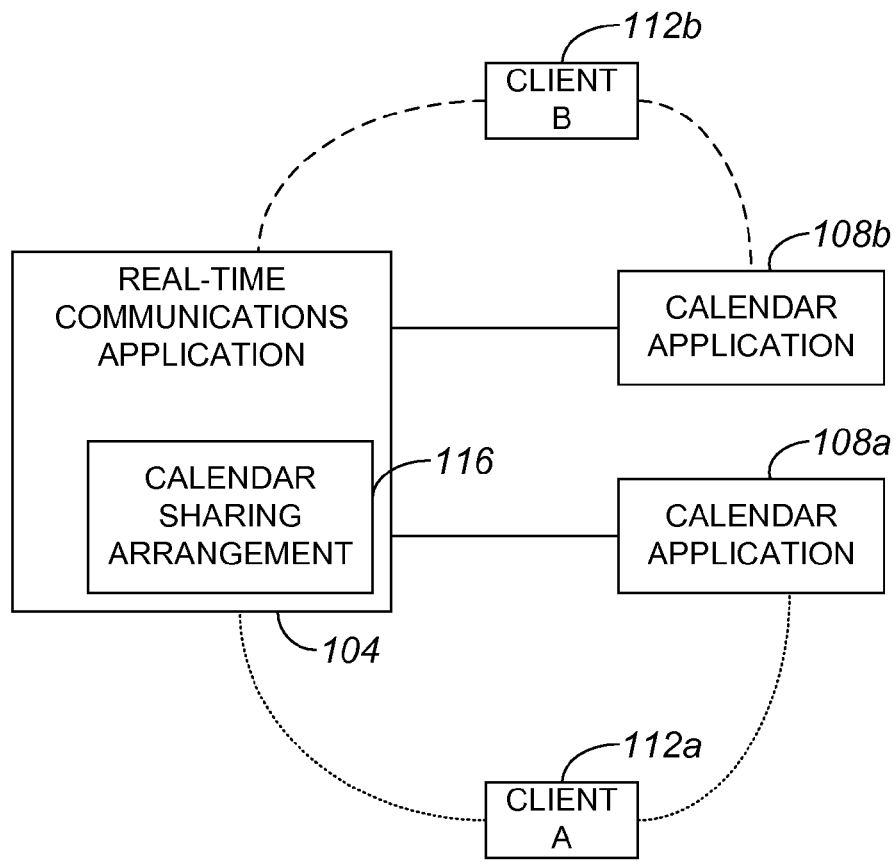
FIG. 1A is a block diagram representation of a system in which a real-time communications application may access a calendar application in accordance with an embodiment of the present invention.

In general, the present invention provides the ability for users or clients of a real-time communications application to share their individual calendars substantially within the real-time communications application. The sharing of calendars involves dynamically creating permissions or authorizations that allow the users of the real-time communications application that enable those users to access the calendars of fellow users. FIG. 1A is a block diagram representation of a system in which a real-time communications application is configured to access an external calendar application in accordance with an embodiment of the present invention. A real-time communications application 104 is arranged to be used by a plurality of clients 112a, 112b in order to communicate in real-time. Real-time communications application 104 may be any suitable application which permits clients 112a, 112b to communicate in real-time. By way of example, real-time communications application 104 may be associated with a Voice over Internet Protocol (VoIP) application, a video conferencing application, a phone application, or an IM application. In one embodiment, real-time communications application 104 may include hardware and/or software logic embodied in a tangible media.

Real-time communications application 104 includes a calendar sharing arrangement 116 that provides the ability for clients 112a, 112b to share calendar information with each other through real-time communications application 104. That is, calendar sharing arrangement 116 allows clients 112a, 112b to share their respective calendars through real-time communications application 104. Calendar sharing arrangement 116 may be configured to obtain information from calendar application 108a, which is associated with client 112a, and from calendar application 108b, which is associated with client 112b. Calendar applications 108a, 108b may be standalone applications which allow clients 112a, 112b, respectively, to maintain calendars. Alternatively, calendar applications 112a, 112b may be components of another application (not shown), e.g., a personal information management application.

Calendar sharing arrangement 116 may render calendar views from information obtained from calendar applications 108a, 108b, and allow clients 112a, 112b to effectively manipulate their respective calendars from within real-time communications application 104 while engaging in real-time communications. In one embodiment, calendar sharing arrangement 116 allows clients 112a, 112b to schedule future appointments with each other in their calendars while participating in real-time communications. In another embodiment, calendar sharing arrangement 116 allows clients 112a, 112b to view each others calendars while participating in real-time communications, but does not allow clients 112a, 112b to actually schedule appointments on each other's calendars.

Figure 1B:
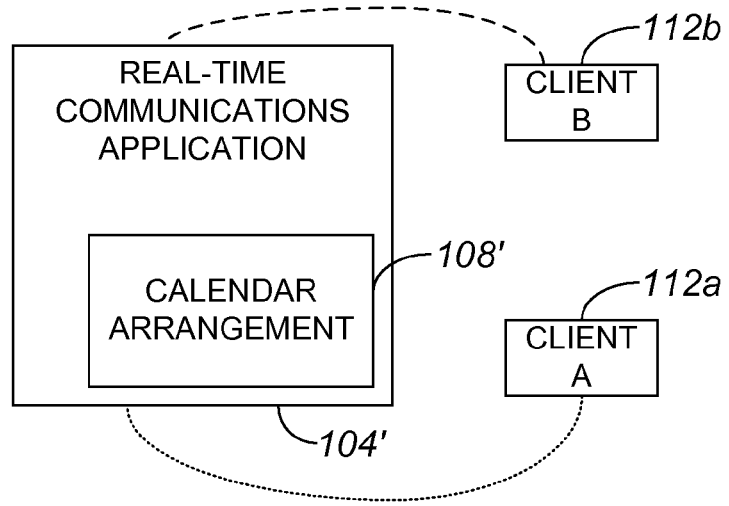
FIG. 1B is a block diagram representation of a system in which a real-time communications application includes a calendar application in accordance with an embodiment of the present invention.

Rather than including calendar sharing arrangement 116 which utilizes information obtained from calendar applications 108a, 108b, a real-time communications application may instead substantially directly include a calendar. FIG. 1B is a block diagram representation of a system in which a real-time communications application includes a calendar application in accordance with an embodiment of the present invention. A real-time communications application 104' includes a calendar application 108' that maintains calendars of clients 112a, 112b. When clients 112a, 112b use real-time communications application 104' to communicate in real-time with each other, clients 112a, 112b may share and manipulate their calendars using calendar application 108'. If clients 112a, 112b identify a future time slot for a meeting between clients 112a, 112b, calendar application 108' may allow the time slot to be marked as "busy" in the calendars of each client 112a, 112b.

Figure 1C:
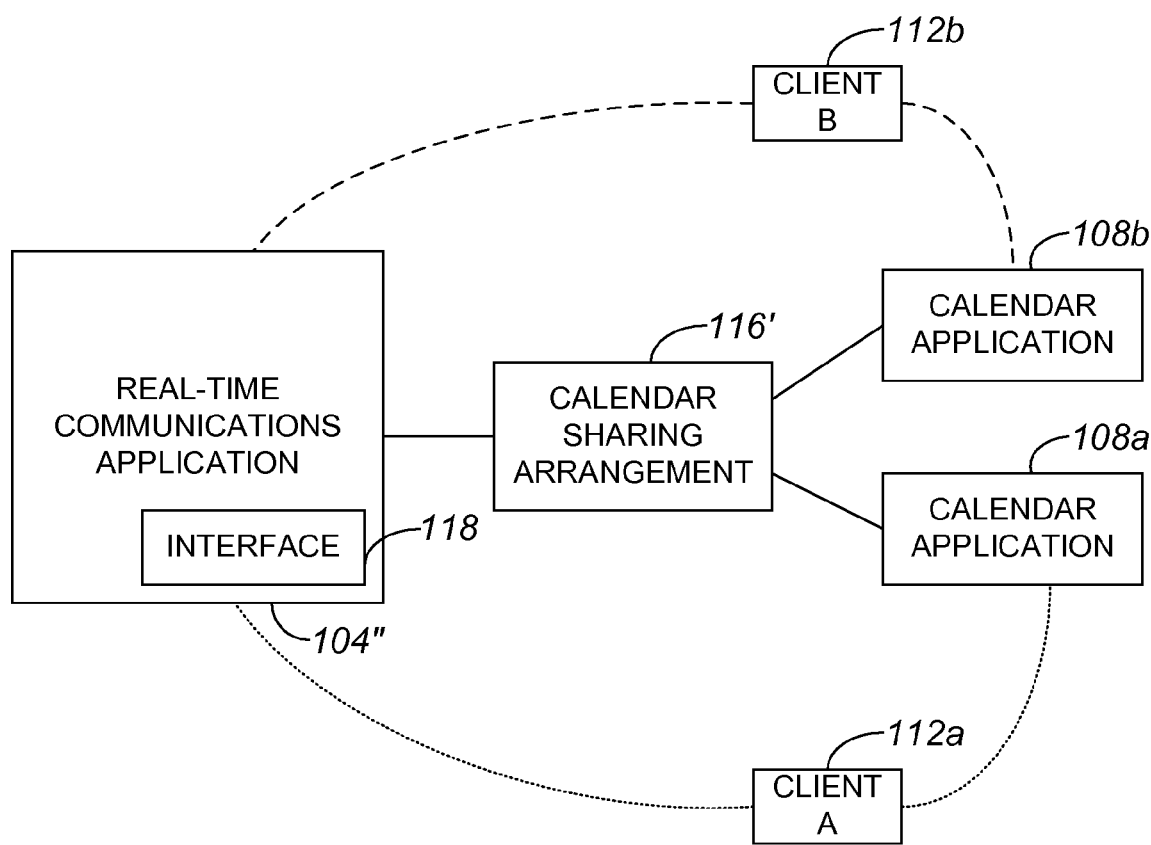
FIG. 1C is a block diagram representation of a system in which a real-time communications application may access a calendar application through a calendar sharing application in accordance with an embodiment of the present invention.

In some systems, a real-time communications application may utilize an external calendar sharing arrangement to allow clients to share their calendars while engaging in real-time communications. Referring next to FIG. 1C, one system in which a real-time communications application may access a calendar application through an external calendar sharing application will be described in accordance with an embodiment of the present invention. Clients 112a, 112b may communicate in real-time using a real-time communications application 104". Real-time communications application 104" provides clients 112a, 112b with the ability to share and to manipulate their calendars. Typically, a calendar for client 112a is maintained by calendar application 108a, while a calendar for client 112b is maintained by calendar application 108b.

Real-time communications application 104" effectively accesses calendar applications 108a, 108b through a calendar sharing arrangement 116'. An interface 118 within real-time communications application 104" allows calendar sharing arrangement 116' to be accessed. In cooperation with calendar sharing arrangement 116', real-time communications application 104" renders calendars of clients 112a, 112b substantially such that the calendars are effectively shared within real-time communications application 104".

Figure 2A:
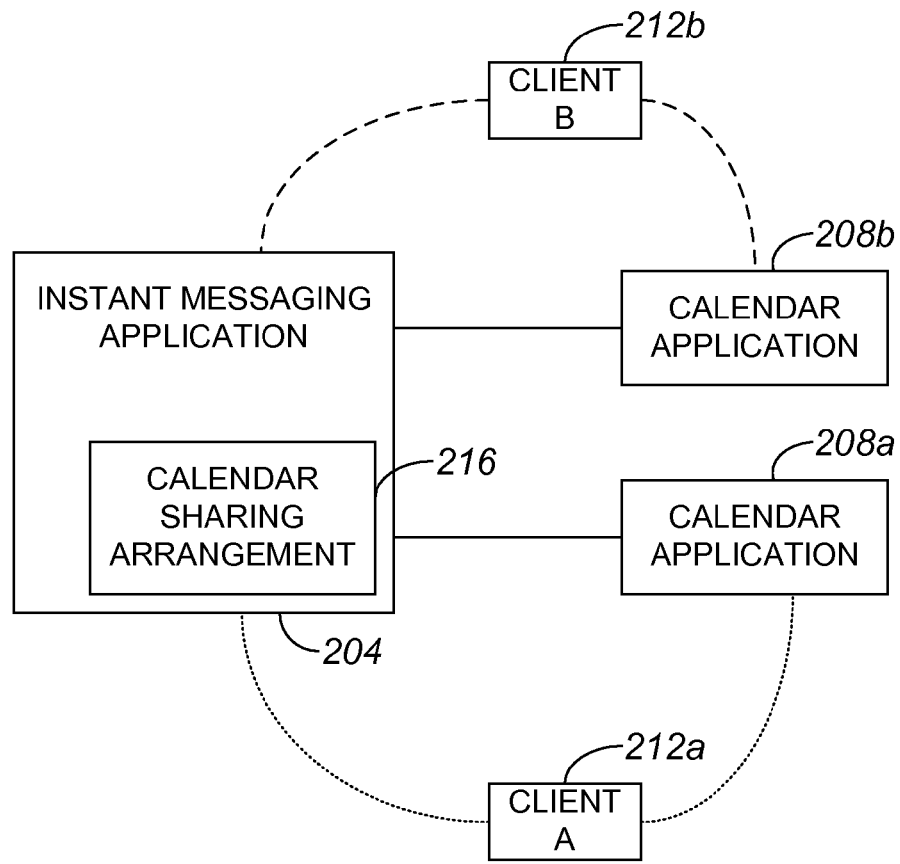
FIG. 2A is a block diagram representation of a system in which an instant messaging application may access a calendar application in accordance with an embodiment of the present invention.

As previously mentioned, a real-time communications application may be an IM application. The IM application may include hardware and/or software logic that allows clients engaged in an IM session, e.g., an IM chat or conversation, to share their calendars and schedule future appointments such as conference calls. With reference to FIG. 2A, a system in which an IM application may access a calendar application will be described in accordance with an embodiment of the present invention. An IM application 204 allows a plurality of clients 212a, 212b to engage in an IM session. During the course of an IM session, clients 212a, 212b may decide to share their calendars, which are typically maintained by calendar applications 208a, 208b, respectively. A calendar sharing arrangement 216 is configured to obtain information from calendar applications 208a, 208b, and to render or otherwise display the calendars of clients 212a, 212b. In one embodiment, the calendars of clients 212a, 212b may be displayed in an overall window or display screen associated with an established IM session. Clients 212a, 212b may identify time slots or periods during which a future appointment may be scheduled using the displayed calendars, and effectively mark selected time slots as "busy." By way of example, clients 212a, 212b may use calendars rendered by calendar sharing arrangement 216 to schedule a future conference call between clients 212a, 212b. If, during the course of scheduling a future appointment, clients 212a, 212b wish to communicate with each other in real time, clients 212a, 212b may engage in communications through the established IM session.

Figure 2B:
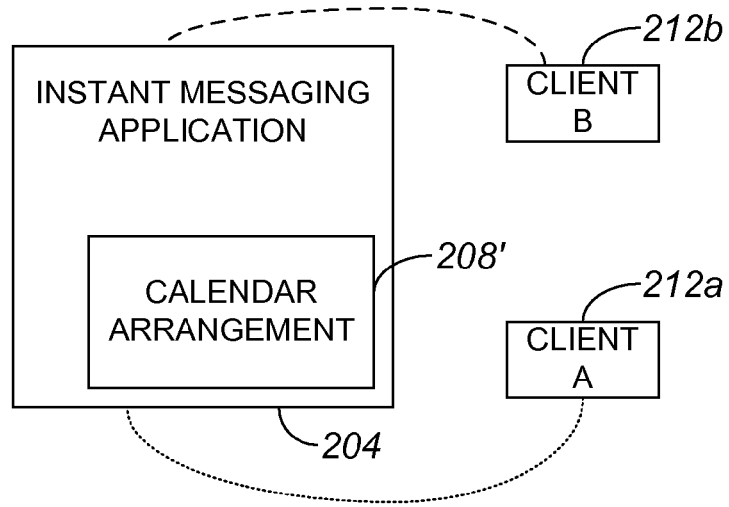
FIG. 2B is a block diagram representation of a system in which an instant messaging application includes a calendar application in accordance with an embodiment of the present invention.

In one embodiment, an IM application may include a calendar application. FIG. 2B is a block diagram representation of a system in which an IM application includes a calendar application in accordance with an embodiment of the present invention. An IM application 204' includes a calendar application 208' that maintains calendars of clients 212a, 212b. Hence, when clients 212a, 212b are engaged in an IM session and decide to share their calendars, calendar application 208' allows the calendars to be shared such that clients 212a, 212b may view each other calendars. If clients 212a, 212b identify an available time slot for a meeting between clients 212a, 212b, calendar application 208' allows the time slot to be marked as "busy" in the calendars of each client 212a, 212b.

Figure 2C:
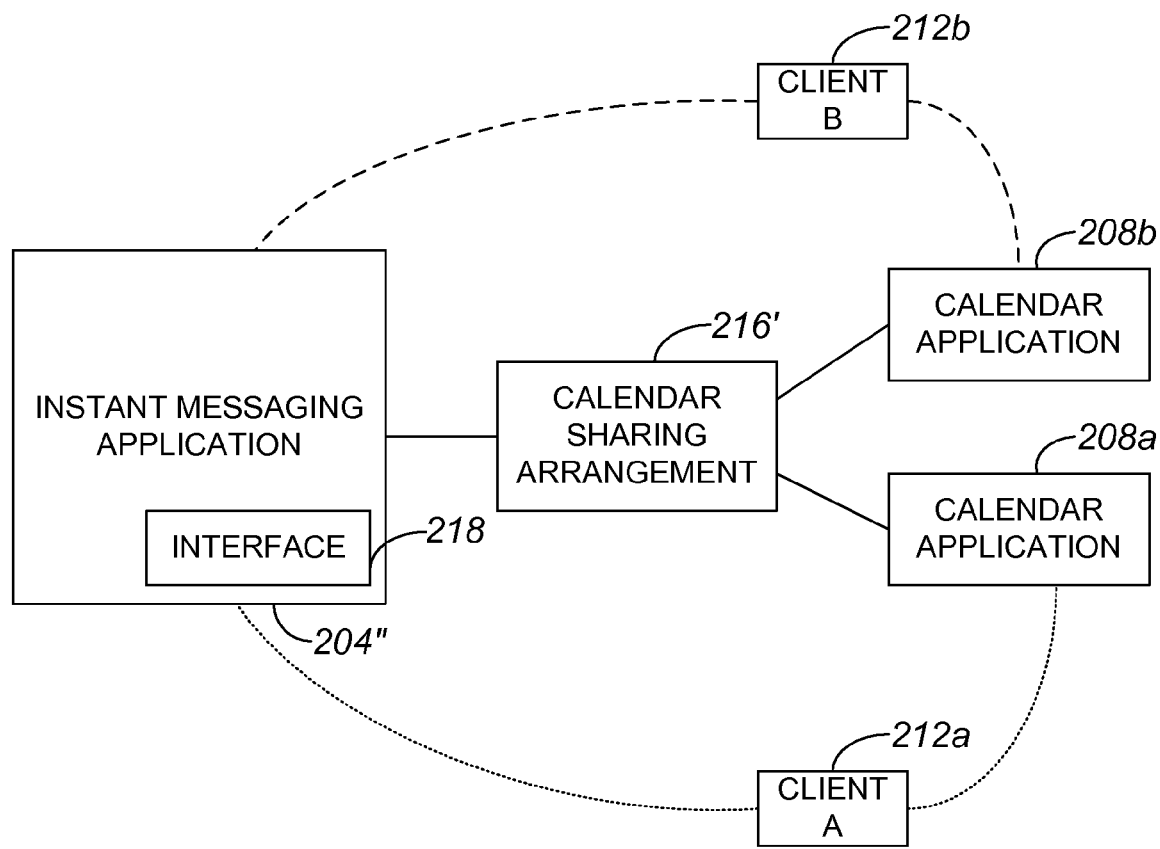
FIG. 2C is a block diagram representation of a system in which an instant messaging application may access a calendar application through a calendar sharing application in accordance with an embodiment of the present invention.

An IM application may utilize an external calendar sharing arrangement to allow clients to share their calendars while participating in an IM session. FIG. 2C is a block diagram representation of a system in which an IM application may access a calendar application through an external calendar sharing application in accordance with an embodiment of the present invention. Clients 212a, 212b may use an IM application 204" to engage in an IM session. During an IM session, clients 212a, 212b may elect to share their calendars. IM application 204" cooperates with a calendar sharing arrangement 216' to provide clients 212a, 212b with the ability to share and to manipulate their calendars which are maintained by calendar applications 208a, 208b, respectively.

An interface 218 within IM application 204" allows calendar sharing arrangement 216' to be accessed while clients 212a, 212b are engaged in an IM session. In cooperation with calendar sharing arrangement 216', IM application 204' may render or otherwise display calendars of clients 212a, 212b substantially such that the calendars may be shared within during an IM session.

Figure 3A:
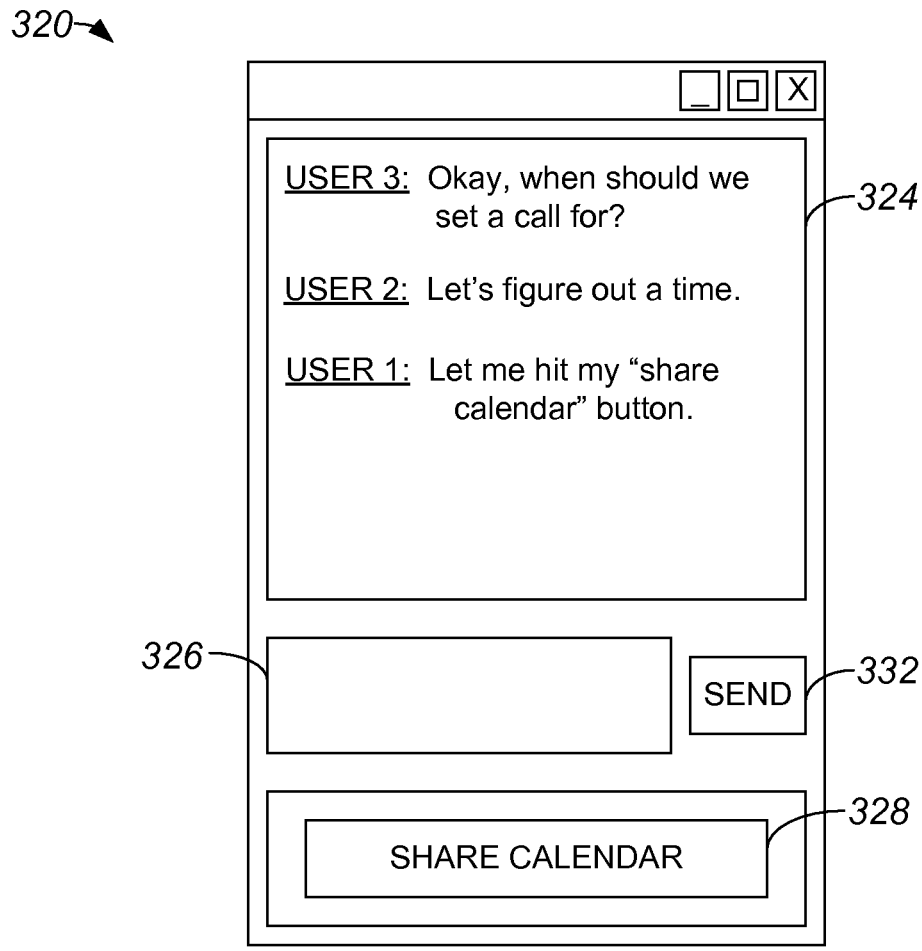
FIG. 3A is a diagrammatic representation of an instant messaging display associated with an instant messaging application at a time t1 prior to calendars being shared in accordance with an embodiment of the present invention.

Typically, an IM application which provides the capability for participants in an IM session or conversation to share their calendars is arranged to provide the shared calendars in a section of an IM window. Referring next to FIGS. 3A-3D, display screens that are associated with the sharing of calendars during an IM conversation will be described in accordance with an embodiment of the present invention. FIG. 3A is a diagrammatic representation of an IM display associated with an IM application at a time t1 prior to calendars being shared in accordance with an embodiment of the present invention. An IM display 320, which may be maintained during an IM session or conversation, is displayed on a display screen of a user while the user participates in the IM session. IM display 320 includes a dialogue window 324 which displays a real-time, text-based conversation. A text entry window 326 allows a user on whose computer screen IM display 320 is presented, e.g., "user 1," to enter text that is to be displayed in dialogue window 324 and, hence, presented to all users who participate in the IM session. "User 1" may publish the text entered in text entry window 326 in dialogue window 324 by selecting, as for example clicking on, a send button 332.

A "share calendar" button 328 may be selected if "user 1" wishes to share his or her calendar with other users or participants in the IM session. That is, selecting or clicking on "share calendar" button 328 allows "user 1" to dynamically create permissions that enable his or her fellow participants in the IM session to access his or her calendar.

Figure 3B:
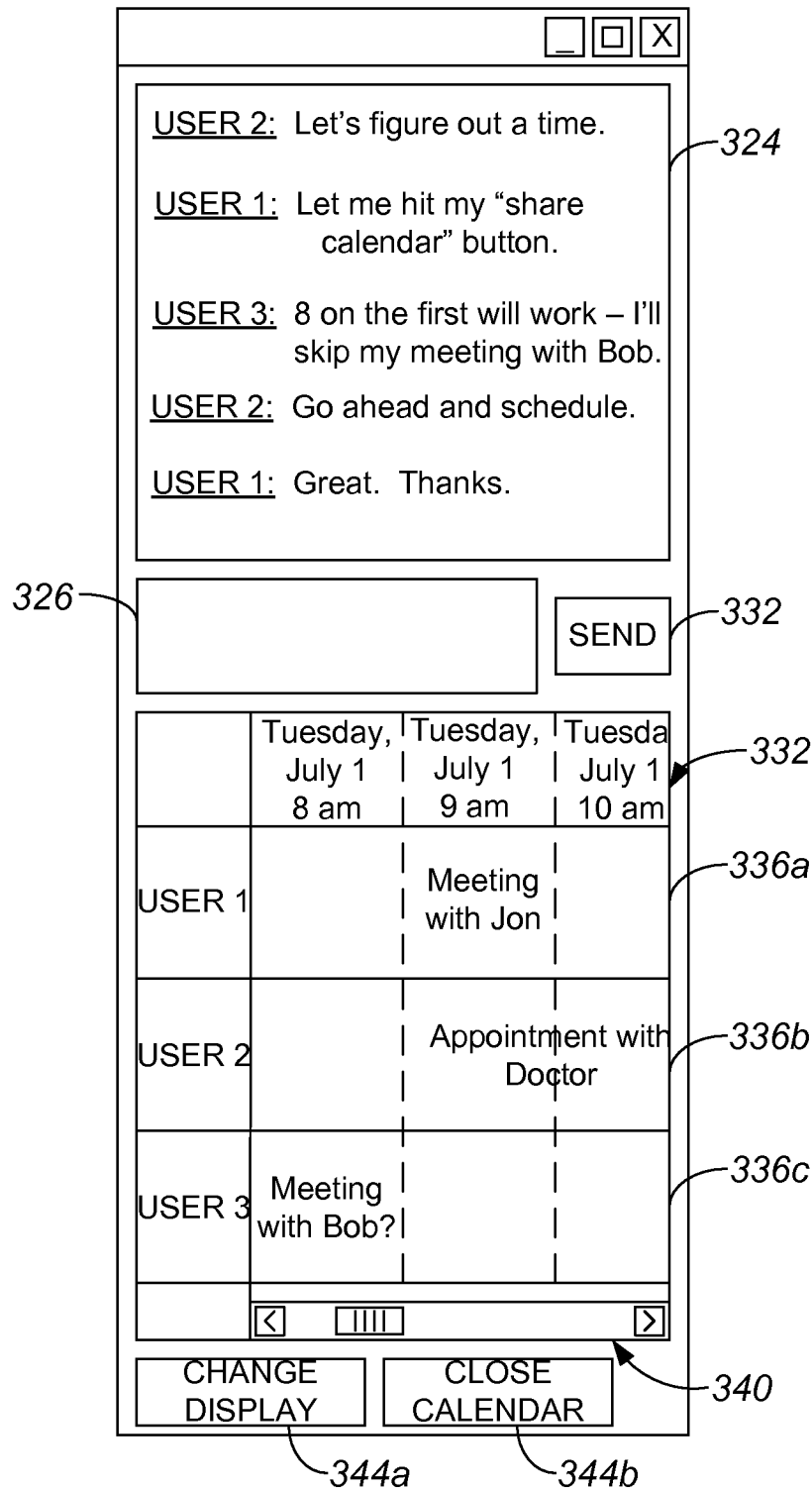
FIG. 3B is a diagrammatic representation of an instant messaging display, e.g., display 320 of FIG. 3A, at a time t2 after calendars have been shared in accordance with an embodiment of the present invention.

Once "user 1" clicks on "share calendar" button 328, calendars of substantially all participants in the IM session are shared at a time t2. FIG. 3B shows display 320 at time t2 after calendars of "user 1," "user 2," and "user 3" have been shared. In the described embodiment, once one of the participants in an IM session initiates the sharing of calendars, calendars of substantially all participants in the IM session who maintain calendars may be shared. It should be appreciated, however, that when the sharing of calendars is initiated during an IM session, the participants in the IM session may each be prompted to affirmatively agree to share their calendars. That is, each participant in the IM session may effectively be asked if he or she acquiesces to the granting of permission for every other participant to view his or her calendar.

At time t2, IM display 320 expands to include a shared calendar window 332 in response to a request to share calendars. Calendars 336a-c of participants in the IM session are displayed in a shared calendar window 332. A scroll bar 340 allows calendars 336a-c to be scrolled through. It should be appreciated that the manner in which calendars 336a-c are displayed and scrolled through may vary widely.

A "change display" button 344a may be selected or actuated to change the display of calendars 336a-c. As shown, calendars 336a-c are displayed in hourly increments. "Change display" button 344a may be selected to change the display of calendars 336a-c, for example, such that calendars 336a-c are displayed in daily increments, or may be selected to effectively change the date range shown in calendars 336a-c. A "close calendar" button 344b may be selected to close shared calendar window 332. It should be appreciated that in lieu of buttons 344a, 344b, menus which allow calendars 336a-c to effectively be manipulated may be provided.

In the embodiment as shown, there is no time slot displayed in calendars 336a-c during which each user is available for a future conference call. To establish whether one of the users is willing to skip a meeting or an appointment, the users may engage in real-time dialogue through dialogue window 324.

Figure 3C:
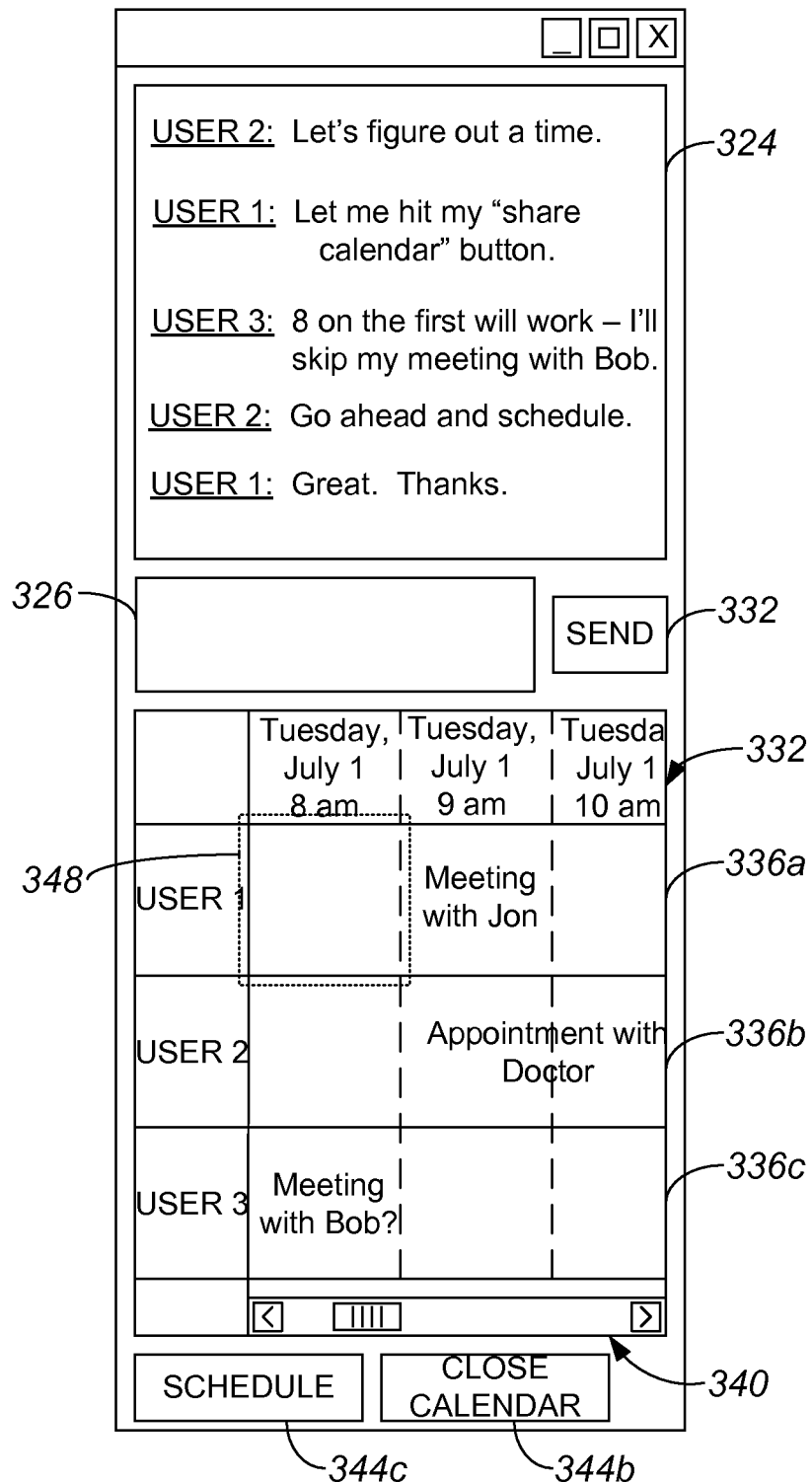
FIG. 3C is a diagrammatic representation of an instant messaging display, e.g., display 320 of FIG. 3A, at a time t3 after a time for a future conference call has been selected in accordance with an embodiment of the present invention.

Once a suitable time for a future conference call is identified, the future conference call may be scheduled at a time t3 using calendars 336a-c. As shown in FIG. 3C, "user 1" may select a time slot 348 during which the future conference call is to be scheduled. Selecting time slot 348 may include moving a cursor (not shown) over time slot 348 and clicking on time slot 348, e.g., using a button on a computer mouse or a keyboard. In one embodiment, selecting one time slot on any of calendars 336a-c may allow the corresponding time slots on the other calendars 336a-c to effectively be marked as "busy." Furthermore, when "user 1" selects a candidate timeslot from within his or her IM application, the other users in an IM conference may effectively view which time slot "user 1" has selected. Similarly, when "user 1" scrolls through the calendar, or changes the view from one view to another, that change may be visible immediately to the other users in the IM conference.

When time slot 348 is selected, a "schedule" button 344c may appear in display window 320. By selecting "schedule" button 344c, time slot 348 and the corresponding time slots in calendars 336b, 336c may be marked as "busy." Alternatively, if "user 1" selects "schedule" button 344c, an invitation may be sent to "user 2" and to "user 3" to invite "user 2" and "user 3" to join in a conference call during time slot 348. Alternatively, if "user 1" selects "schedule" button 344c, "user 2" and "user 3" may be prompted substantially immediately within the IM application to accept or to reject the conference call invitation. Each user may independently accept or reject the conference call application, which typically causes their respective calendars to show that they are busy for the corresponding time.

In lieu of selecting "schedule" button 344c, "user 1" may instead double click on time slot 348 to mark time slot 348 and the corresponding time slots in calendars 336b, 336c as "busy." In one embodiment, marking time slot 348 and corresponding time slots in calendars 336b, 336c as busy may include being provided with a text entry field (not shown) which allows "user 1" to enter a title for the future conference call being scheduled.

Figure 3D:
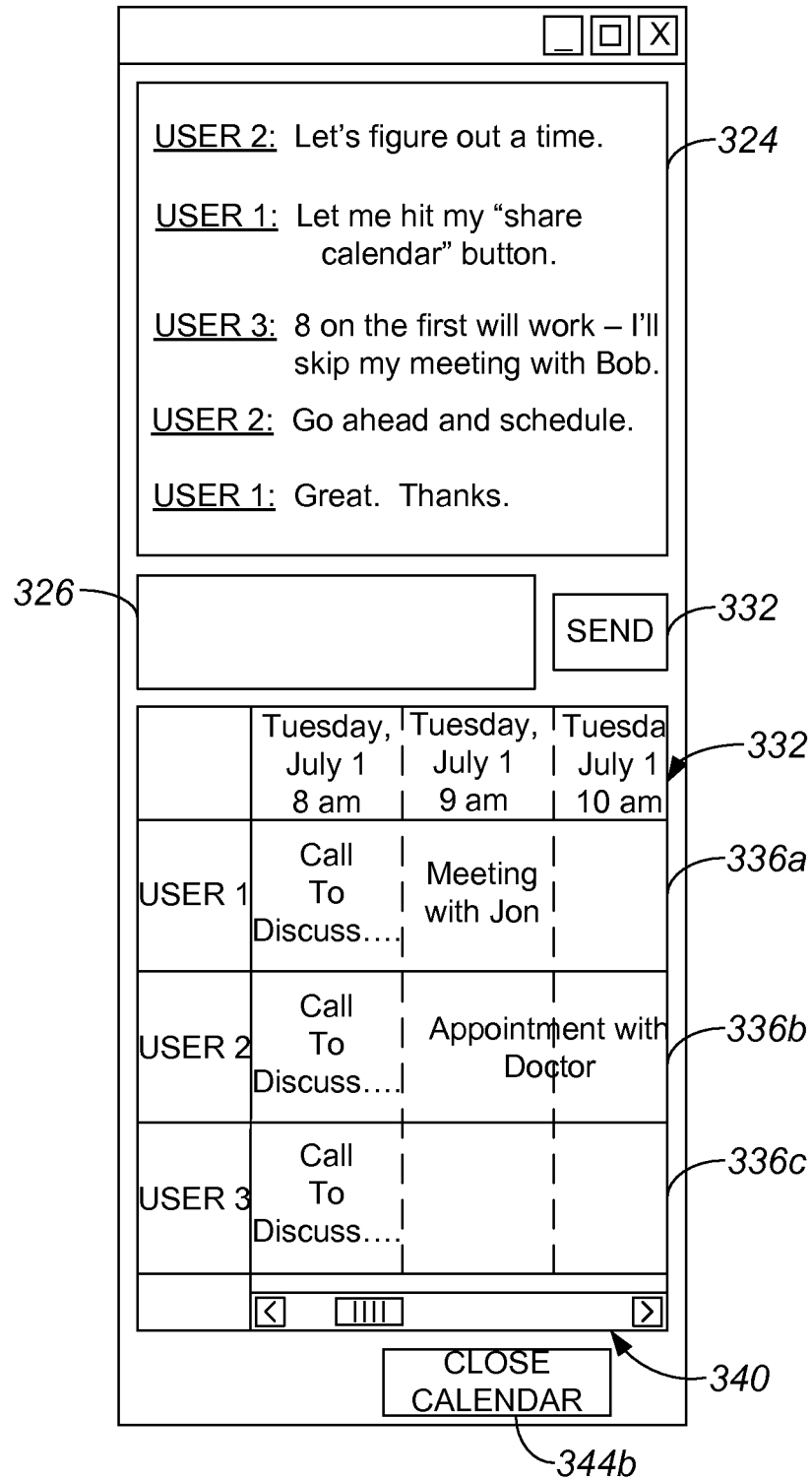
FIG. 3D is a diagrammatic representation of an instant messaging display, e.g., display 320 of FIG. 3A, at a time t4 after a future conference call has been scheduled in accordance with an embodiment of the present invention.

FIG. 3D is a representation of IM display 320 at a time t4 after a future conference call has been scheduled in accordance with an embodiment of the present invention. As shown in calendars 336a-c, the future conference call is scheduled for all users associated with the IM session.

Figure 4:
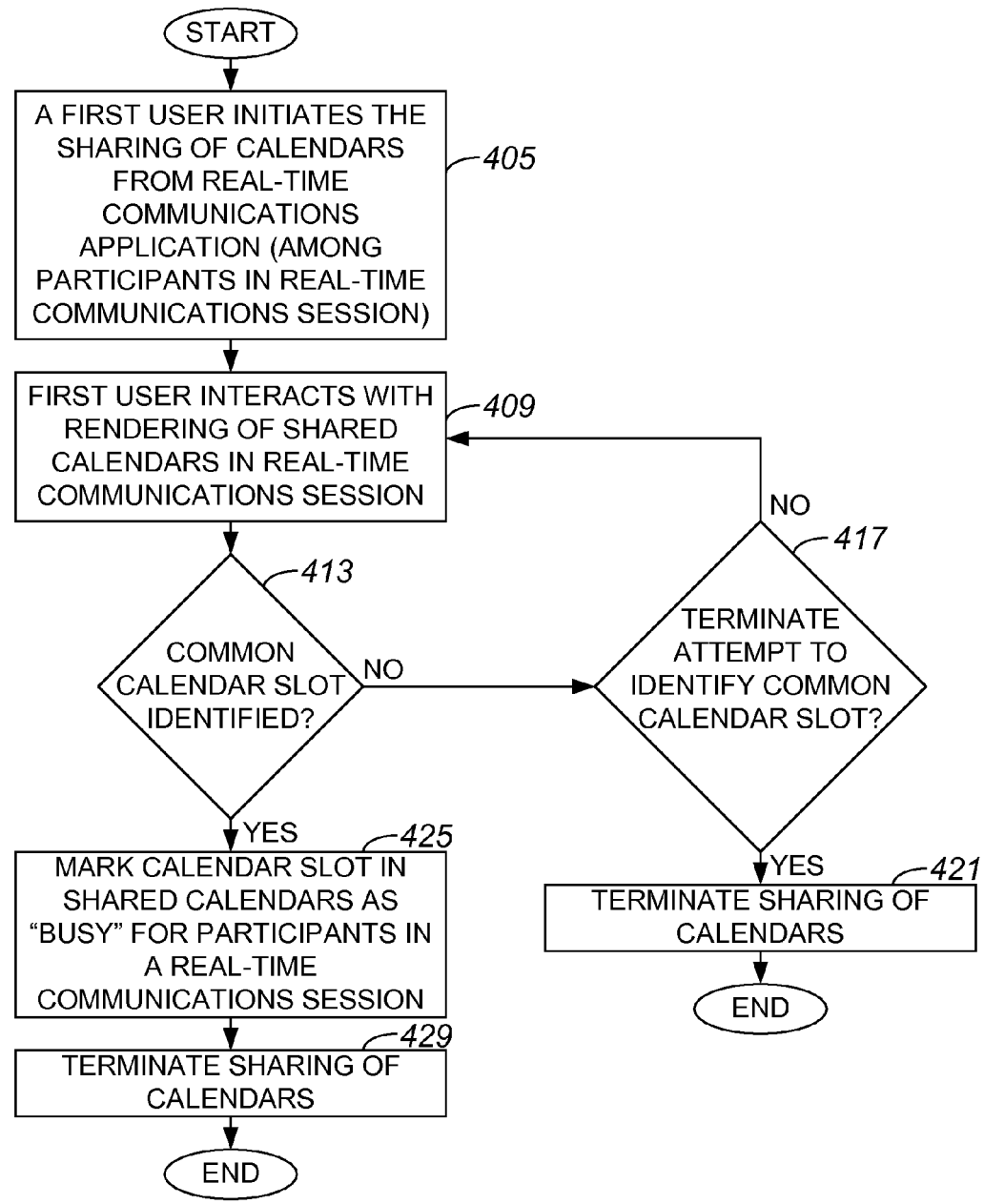
FIG. 4 is a process flow diagram which illustrates a method of effectuating the sharing of calendars from a real-time communications application in accordance with an embodiment of the present invention.

Substantially any participant in an IM session or, more generally, a real-time communications session, may initiate the sharing of calendars. FIG. 4 is a process flow diagram which illustrates a method of a first user effectuating the sharing of calendars from a real-time communications session in accordance with an embodiment of the present invention. A process 401 of effectuating the sharing of calendars begins at step 405 in which the first user initiates the sharing of calendars amongst substantially all participants in a real-time communications session. In other words, the first user initiates the dynamic granting of permissions to participants in the real-time communication session. Each participant in the real-time communications session, including the first user, may dynamically grant permission that enables every other participant to at least temporarily access his or her calendar. Such grants of permission may be substantially automatic, or may be achieved upon affirmative actions taken by each participant in response to an invitation to share his or her calendar, e.g., each participant may be prompted to acquiesce to the sharing of his or her calendar.

In step 409, the first user interacts with the rendering of shared calendars in the real-time communications session. That is, the first user views and manipulates the calendars as displayed with respect to the real-time communications session. It should be appreciated that substantially all participants in the real-time communications session may interact with the rendering of shared calendars. In one embodiment, substantially all users in the session will have the ability to see the interactions with the calendar made by the first user.

A determination is made in step 413 as to whether a common calendar slot is identified during which a future appointment or meeting may be scheduled to include substantially all of the participants in the real-time communications session. If it is determined that no common calendar slot has been identified, the indication may be that there is no time slot during which substantially all participants are available during a particular range of dates. Accordingly, process flow moves from step 413 to step 417 in which it is determined whether the attempt to identify a common calendar slot is to be terminated. If the determination is that the attempt to identify a common calendar slot is not to be terminated, the implication may be that the first user may attempt to find a common calendar slot by changing the particular range of dates in which he or she is searching. As such, process flow returns to step 409 in which the first user interacts with the rendering of shared calendars. Alternatively, if the determination in step 417 is that the attempt to identify a common calendar slot is to be terminated, the sharing of calendars is terminated in step 421, and the process of effectuating the sharing of calendars is completed.

Returning to step 413, if it is determined that a common calendar slot has been identified, that calendar slot is marked as "busy," "unavailable," or otherwise spoken for in step 425 with respect to the shared calendars of each participant in the real-time communications session. It should be appreciated that substantially any participant in the real-time communications session may cause the calendar slot to be marked as "busy." The other participants may be prompted to agree to the meeting, or the meeting may be scheduled automatically. The other participants may also see, within the IM application, the fact that this timeslot has been selected. Once the calendar slot is marked as "busy" in each shared calendar, the sharing of calendars is terminated in step 429, and the process of effectuating the sharing of calendars is completed.

Figure 5A:
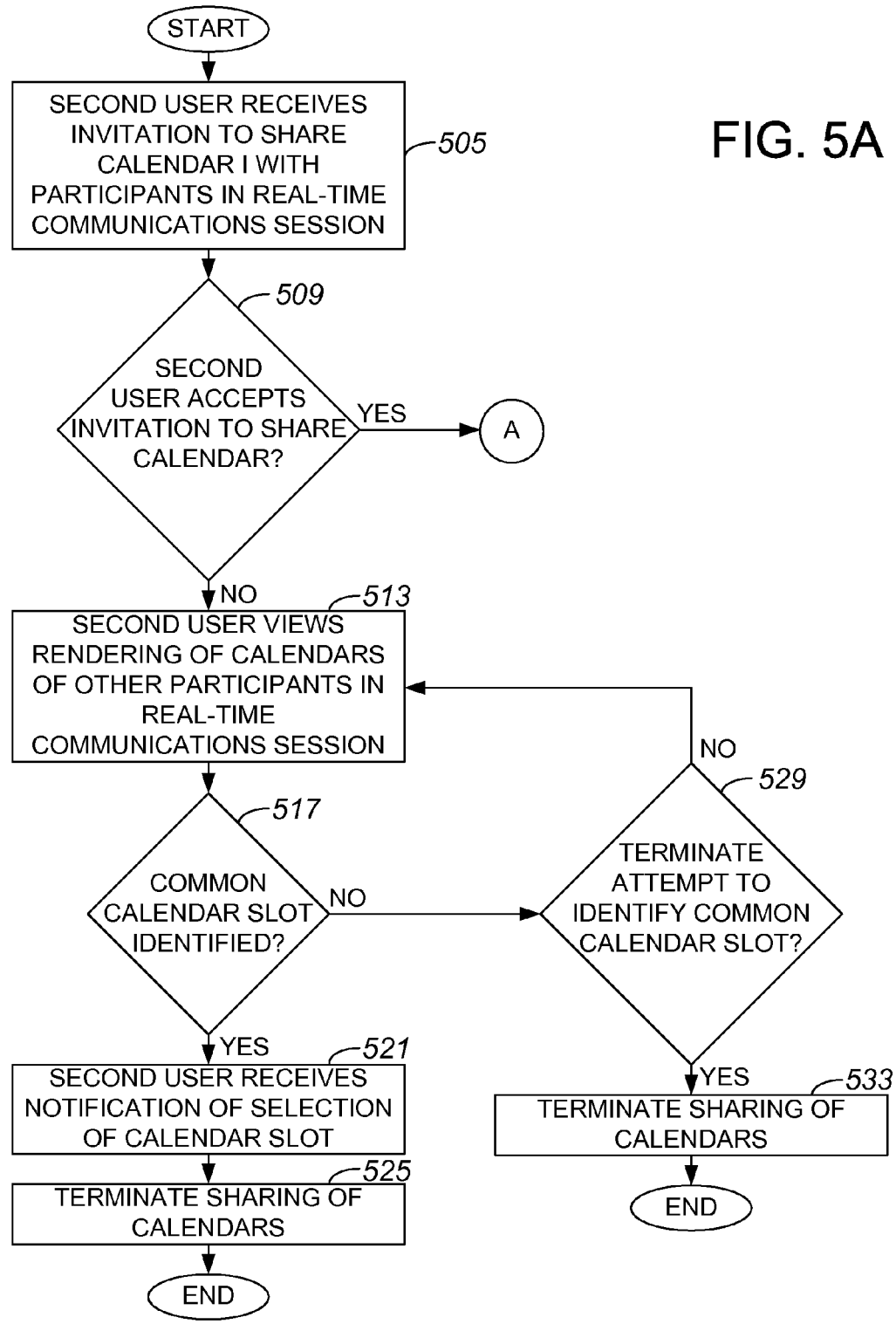
FIGS. 5A and 5B are a process flow diagram which illustrates a method of sharing a calendar in response to an invitation to share the calendar in accordance with an embodiment of the present invention.
Figure 5B:
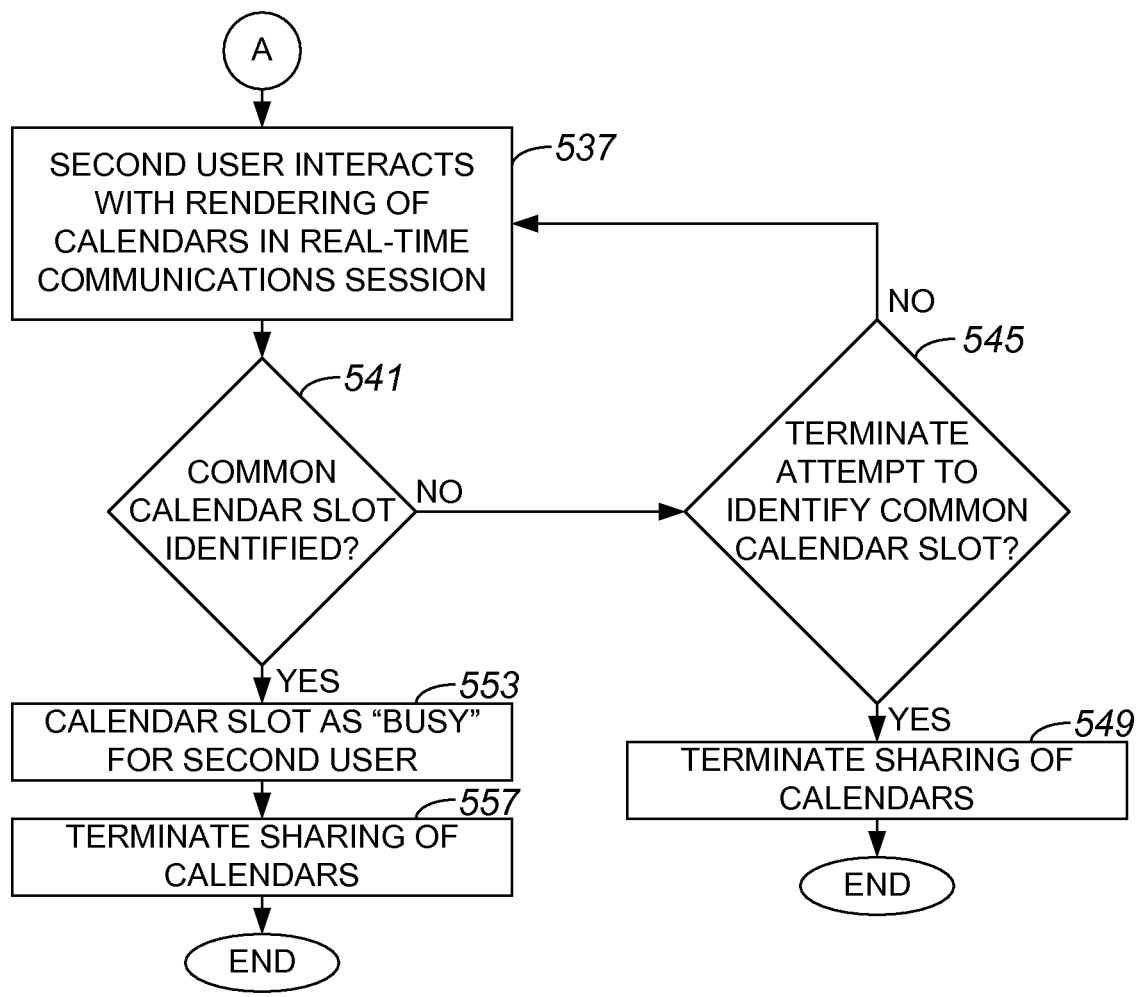

As previously discussed, when one participant in or user associated with a real-time communications session initiates the sharing of calendars, other participants in the real-time communications session may be prompted to consent to the sharing of their calendars. In other words, other participants may be given a choice of whether or not they wish to share their calendars. FIGS. 5A and 5B are a process flow diagram which illustrates a method of a participant or user sharing his or her calendar in response to a received request or invitation to share in accordance with an embodiment of the present invention. A process 501 of sharing a calendar begins at step 505 in which a second user, who is a participant in a real-time communications session supported by a real-time communications application, receives an invitation to share his or her calendar. Such an invitation is typically initiated by another user who is also a participant in the real-time communications session.

A determination is made in step 509 as to whether the second user accepts the invitation to share his or her calendar with other participants in the real-time communications session. The second user may elect not to accept the invitation to share the calendar for a variety of different reasons. By way of example, the second user may elect not to share his or her calendar due to privacy concerns, or the second user may not actually have a calendar to share. If the determination is that the second user does not accept the invitation to share his or her calendar, then in step 513, the second user views renderings of the shared calendars of other participants in the real-time communications session. However, the other participants are unable to view the calendar of the second user. In one embodiment, if the second user does not share a calendar with other participants in the real-time communications session, the second user may be prevented from being able to interact with the shared calendars and may, instead, substantially only be provided with the ability to view the shared calendars.

It should be appreciated that in one embodiment, if the second user does not share his or her calendar, he or she may be prevented from viewing renderings of the shared calendars of other participants. On the other hand, if the second user elects not to share his or her calendar for privacy reasons, the second user alone may be provided with a rendering of his or her own calendar along with renderings of the shared calendars.

In step 517, a determination is made regarding whether a common calendar slot is identified. If it is determined that a common calendar slot has not been identified, it is then determined in step 529 whether the attempt to identify a common calendar slot is to be terminated. If the determination is that the attempt to identify a common calendar slot is to be terminated, the sharing of calendars is terminated in step 533, and the process of sharing a calendar is completed. Alternatively, if it is determined that the attempt to identify a common calendar slot is not to be terminated, process flow returns to step 513 in which the second user views the rendering of the shared calendars of other participants in the real-time communications session.

If the determination in step 517 is that a common calendar slot has been identified, then the second user receives a notification of the selection of a calendar slot in step 521. As the second user has not shared his or her calendar, he or she has effectively not granted permission that enables participants in the real-time communications session to schedule appointments or meetings on his or her calendar. Hence, the second user may be notified of a scheduled appointment or meeting through an e-mail or an instant message, for example, that is generated by the real-time communications application which supports the real-time communications session. In one embodiment, the second user may receive an invitation to join the scheduled appointment or meeting. Once the second user is notified of the selection of a calendar slot, the sharing of calendars is terminated in step 525. Then, the process of sharing a calendar is completed.

Returning to step 509, if it is determined that the second user accepts an invitation to share his or her calendar, then process flow proceeds to step 537 in which the second user interacts with the rendering of calendars in the real-time communications session. Then, in step 541, a determination is made as to whether a common calendar slot is identified during which a future appointment or meeting may be scheduled to include substantially all of the participants in the real-time communications session.

If the determination in step 541 is that no common calendar slot has been identified, process flow moves from step 541 to step 545 in which it is determined whether the attempt to identify a common calendar slot is to be terminated. If the determination is that the attempt to identify a common calendar slot is not to be terminated, process flow returns to step 537 in which the second user interacts with the rendering of shared calendars. Alternatively, if the determination in step 545 is that the attempt to identify a common calendar slot is to be terminated, the sharing of calendars is terminated in step 549, and the process of effectuating the sharing of calendars is completed.

If, on the other hand, it is determined in step 541 that a common calendar slot has been identified, that calendar slot is marked as "busy," "unavailable," or otherwise spoken for in step 553 with respect to the calendar of the second user and, additionally, with respect to the shared calendars of each participant in the real-time communications session. Each user sees, within his or her IM application, that this is the chosen timeslot, and each user may be given an opportunity to accept or reject the addition of this meeting to their calendar. The sharing of calendars is then terminated in step 557, and the process of sharing a calendar is completed.

Figure 6:
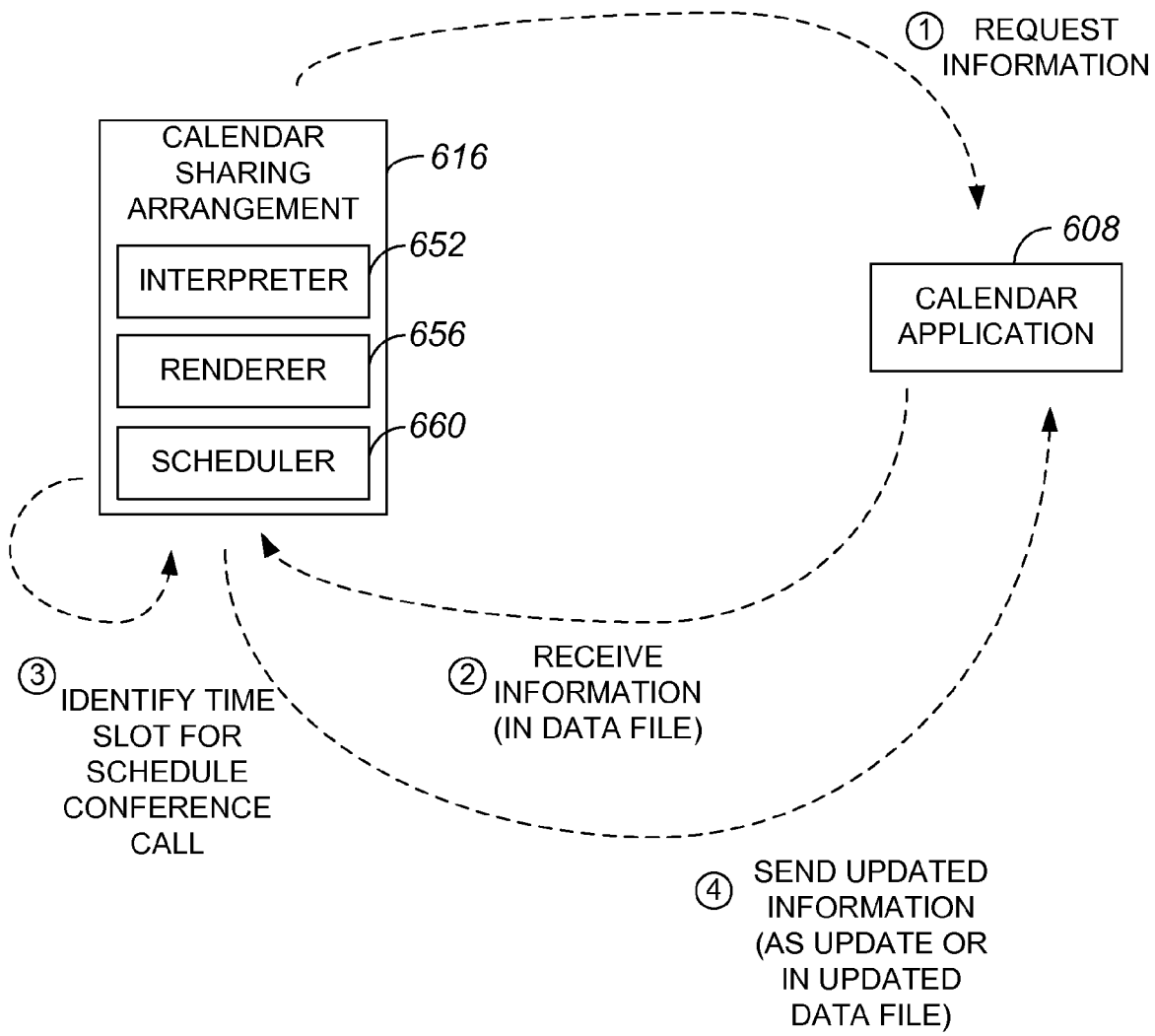
FIG. 6 is a diagrammatic representation a flow of information between a calendar sharing arrangement and a calendar application in accordance with an embodiment of the present invention.

With reference to FIG. 6, a flow of information between a calendar sharing arrangement, i.e., a calendar sharing arrangement that is associated with a real-time communications application, and a calendar application will be described in accordance with an embodiment of the present invention. A calendar sharing arrangement 616 is configured to communicate with a calendar application 608. Calendar application 608 generally maintains a calendar that is effectively to be shared in a real-time application associated with calendar sharing arrangement 616.

Calendar sharing arrangement 616 may include an interpreter 652, a renderer 656, and a scheduler 660. Interpreter 652 is configured to interpret or to otherwise process information obtained from calendar application 608. By way of example, interpreter 652 may transform information obtained from calendar application 608 into a format that is understood by calendar sharing arrangement 616. Renderer 656 is configured to render or otherwise present information obtained from calendar application 608 in a display screen or window of an associated computing device (not shown). In other words, renderer 656 may be arranged to facilitate the display of shared calendars. Scheduler 660 is configured to enable users to schedule a conference call using shared calendars. It should be appreciated that scheduler 660 may generally enable any appointment, meeting, or event to be scheduled using a shared calendar.

Calendar sharing arrangement 616, in response to a command to share a calendar, requests information from calendar application 608. Such a request for information may generally be a request for information that may be interpreted by interpreter 652 and rendered by renderer 656 such that a representation of a calendar may be displayed with respect to a real-time communications application (not shown). Calendar sharing arrangement 616 may effectively receive or otherwise access requested information in a data file from calendar application 608. In the described embodiment, calendar sharing arrangement 616 uses the requested information to allow a user either to identify a time slot during which a conference call may be scheduled, or to actually schedule a conference call. After a time slot is identified or, alternatively, after a conference call is scheduled, calendar sharing arrangement 616 provides updated information, as for example information regarding the time slot or a newly scheduled conference call, to calendar application 608. Such updated information may be provided as an update, or such updated information may be provided as an updated version of the data file received by calendar sharing arrangement 616 from calendar application 608. To provide an update to the calendars of the other users in the session, updated information may be passed through an instant messaging channel. This information is generally not rendered to the users directly. Rather, the updated information triggers the IM application of the other users to pass the information to the respective calendars of the other users.

Figure 7:
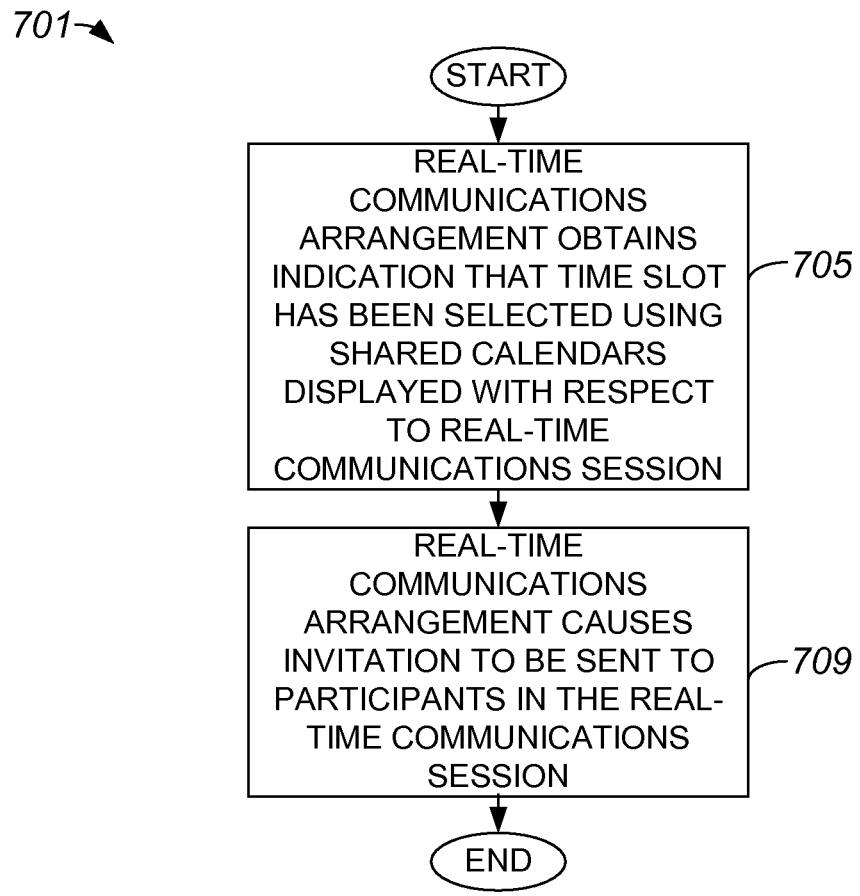
FIG. 7 is a process flow diagram which illustrates a method of notifying participants in a real-time communications session of a meeting after identifying an available time slot using calendars shared in the real-time communications session in accordance with an embodiment of the present invention.

In one embodiment, when a participant in a real-time communications session shares his or her calendar with other participants in the real-time communications session, he or she may substantially only grant permission for the other participants to view his or her calendar, and not to schedule appointment on his or her calendar. Hence, once a time for a future meeting is identified using the shared calendars, a calendar sharing arrangement may cause a calendar application to issue invitations to join the future meeting. Substantially only upon accepting invitations to join the future meeting may the calendars of the participants be updated to mark the time slot for the future meeting as "busy." FIG. 7 is a process flow diagram which illustrates a method of notifying participants in a real-time communications session of an appointment or a meeting after identifying an available time slot using calendars shared in the real-time communications session in accordance with an embodiment of the present invention. A process 701 of notifying participants in a real-time communications session, e.g., an IM conversation, of a future appointment or meeting begins in step 705 in which the real-time communications arrangement obtains an indication, or otherwise determines, that a time slot has been selected for a future appointment. The real-time communications arrangement, which supports the real-time communications session, may determine that a participant has clicked on a "schedule" button associated with a shared calendar window, e.g., "schedule" button 344c of FIG. 3C.

After determining that a time slot for a future appointment or meeting has been selected, the real-time communications arrangement may cause an invitation to be sent to substantially all participants in the real-time communications session in step 709. The real-time communications arrangement may provide, in one embodiment, a list of the participants in the real-time communications session and information relating to the time slot to a calendar application such that the calendar application may send an invitation to the participants that identifies the time slot. The calendar application may send the invitation as an e-mail, for example, which identifies the participant who clicked on a "schedule" button as the originator of the invitation. Typically, however, the invitation is delivered automatically through an instant messaging channel, thereby allowing recipients to accept or to reject the invitation within the IM application itself. Once the invitation is caused to be sent to the participants in the real-time communications session, the process of notifying participants in a real-time communications session of a future appointment or meeting is completed.

In cases in which a calendar application is a user's own calendar, the calendar application can be accessed directly by a user when it resides locally on the user's computer, or over a network by the user when the calendar application does nor reside on the user's computer. Alternatively, in cases in which a calendar application is that of a different user in an IM session, a request for calendaring information may be sent through an instant messaging channel. In one embodiment, such a request is not rendered to the recipient, but rather triggers the IM application to access the recipient's calendar and send the information, again through the instant messaging channel, back to the requestor. That is, permissions to access a calendar may effectively be granted by directly providing a requester with calendaring information, e.g., by sending the calendaring information to the requestor.

Figure 8:
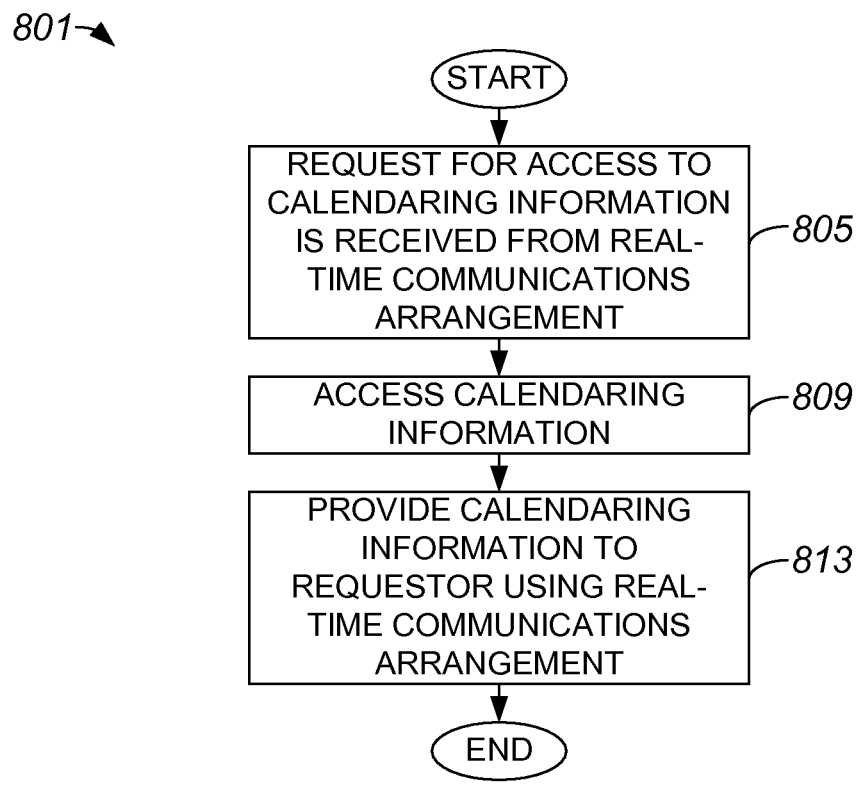
FIG. 8 is a process flow diagram which illustrates a method of sharing calendaring information to a requestor in accordance with an embodiment of the present invention.

FIG. 8 is a process flow diagram which illustrates a method of sharing calendaring information to a requester in accordance with an embodiment of the present invention. A process 801 of providing calendaring information to a requester begins at step 805 in which a request for access to calendaring information is received through a real-time communications arrangement such as an IM application. The request may be from one participant in a real-time communications session to another participant in the real-time communications session.

In step 809, the calendaring information is accessed. The calendaring information may be accessed by the real-time communications arrangement or, more specifically, an instance of the real-time communications arrangement associated with the recipient of the request. Such access may, in one embodiment, be provided by the recipient either substantially automatically or manually, e.g., upon the recipient granting access to his or her calendar.

After the calendaring information is accessed, the real-time communications arrangement provides the calendaring information to the requester in step 813. Providing the calendaring information may include displaying the calendaring information on calendars associated with each participant in the real-time communications session. Once the calendaring information is provided, the process of sharing calendaring information is completed.

Although only a few embodiments of the present invention have been described, it should be understood that the present invention may be embodied in many other specific forms without departing from the spirit or the scope of the present invention. By way of example, an appointment scheduler associated with a calendar sharing arrangement may schedule any suitable appointment or meeting that involves participants in a real-time communication session such as an IM session or conversation. Appointments or meetings may include, but are not limited to including, conference calls, in-person meetings, and/or telepresence meetings. An appointment scheduler may be arranged to substantially directly interface with an external application that enables details associated with an appointment or meeting to be substantially established. For instance, an appointment scheduler may interface with a conference bridge application to set up a conference bridge for use for a scheduled conference call.

In one embodiment, in addition to using a real-time communications application such as an IM application to schedule a future appointment for participants in a real-time communications session, e.g., an IM session or conversation, the IM application may also be used to schedule the future appointment for parties which are not participants in the IM conversation. That is, an appointment scheduler may schedule an appointment call that includes participants in the IM conversation as well as other parties using functionality provided by an IM application.

While participants in an IM session may all maintain calendars that may be shared, some participants may not maintain calendars. If a participant in an IM session does not maintain a calendar, e.g., does not have access to a calendaring application, when meeting time is selected, the participant that does not maintain a calendar may receive an e-mail or other notification of the selected meeting time. That is, a participant who does not maintain a calendar may be notified of a scheduled meeting time. Such a notification may be sent by an IM application upon identification of an e-mail address for the participant to whom the notification is to be provided. An e-mail address may be identified from a database, e.g., a database which associates the IM identifier of the participant with his or her e-mail address, or the participant may be prompted to enter his/her e-mail address into the IM application upon the scheduling of a meeting time. In one embodiment, substantially all participants in an IM session during which a future meeting is scheduled may receive an e-mail or other notification of a selected meeting time without departing from the spirit or the scope of the present invention.

If a participant in an IM session does not maintain a calendar, an indication that he or she does not maintain a calendar may be displayed in a shared calendar window associated with the IM session. Such a participant may be allowed to view the calendars of other participants in the IM session, even though that participant does not share his or her calendar.

An IM application or, more generally, a real-time communications application, may be distributed throughout a network. In such an embodiment, to protect the privacy of individuals participating in IM conversations or real-time sessions, the individuals may be prompted to affirmatively acquiesce to the sharing of their calendars. That is, measures may be implemented to protect the privacy of individuals such that individuals may choose not to share their calendars, e.g., if the individuals believe that the network over which their calendar information is to be transmitted is not secure. In one embodiment, if an individual elects not to share his or her calendar with participants in an IM conversation, he or she may be prevented from viewing the calendars of the participants.

Calendars may be rendered in a window associated with a real-time communications session in a variety of different forms. While calendars have generally been described as being displayed in substantially the same window as a dialogue window of a real-time communications application, calendars are not limited to being displayed in same screen as dialogue window. By way of example, once calendars are shared, the calendars may be displayed in a separate window. Such a window may be opened by the real-time communications application.

When a calendar slot is identified using a real-time communications application during a real-time communications session, e.g., for a future commitment or meeting, that calendar slot may be marked as "busy" for substantially all participants in the real-time communications session. In one embodiment, each participant in the real-time communications session may be substantially required to affirmatively accept the marking of the calendar slot as "busy." That is, the calendar slot may be identified as being taken on the calendars of each participant substantially only upon the acceptance of a meeting or other appointment during that calendar slot by each participant. Alternatively, the calendar slot may instead be identified as being taken without substantially requiring each participant to affirmatively accept the calendar slot as effectively being reserved without departing from the spirit or the scope of the present invention.

The present invention is preferably implemented by software, hardware, or a combination of hardware and software. The present invention may also be embodied as computer readable code or logic embodied on a computer readable medium that may be executed by any suitable computing device. The computer readable medium is typically any data storage device that may store data which may thereafter be read by a computer system that is interfaced with a portable electronic media device, or by a portable electronic media device itself. Examples of the computer readable medium include, but are not limited to including, read-only memory, random-access memory, CD-ROMs, DVDs, magnetic tape, optical data storage devices, and carrier waves. The computer readable medium may also be distributed over network-coupled computer systems so that the computer readable code is stored and executed in a distributed fashion.

While calendars have been described as being shared, the present invention is not limited to being associated with the sharing of calendars. In other words, a real-time communications session such as an IM session may be used to dynamically grant permission to enable participants in the real-time communications session to share resources other than calendars. For example, users may dynamically share information from a project plan application, customer support application, and so on.

The steps associated with the methods of the present invention may vary widely. Steps may be added, removed, altered, combined, and reordered without departing from the spirit of the scope of the present invention. By way of example, once a future appointment such as a conference call is scheduled using shared calendars of participants in a real-time communications session, the real-time communications application that supports the real-time communications session may provide a separate notification to each participant that identifies the future appointment. Therefore, the present examples are to be considered as illustrative and not restrictive, and the invention is not to be limited to the details given herein, but may be modified within the scope of the appended claims.

What is claimed is:

1. A method comprising:
    engaging in real-time communications using a first application, the first application executing on at least one computing system, the real-time communications being arranged to involve a plurality of participants, the plurality of participants including a first participant and a second participant, the first application being an instant messaging (IM) application;
    determining whether the second participant dynamically grants permissions that enable the first participant to interact with a tool associated with the second participant;
    dynamically granting permissions that enable the second participant to interact with a tool associated with the first participant if the second participant dynamically grants the permissions that enable the first participant to the tool associated with the second participant, the permissions that enable the second participant to interact with the tool associated with the first participant being dynamically granted using the first application, the tool associated with the first participant being arranged to be interacted with by the second participant using the first application if the second participant dynamically grants the permissions that enable the first participant to interact with the tool associated with the second participant;
    dynamically granting permissions that enable the second participant to view the tool associated with the first participant if the second participant denies the permissions that enable the first participant to access the tool associated with the second participant; and
    denying the permissions that enable the second participant to interact with the tool associated with the first participant if the second participant denies the permissions that enable the first participant to interact with the tool associated with the second participant.

2. The method of claim 1 wherein engaging in the real-time communications includes engaging in an IM session supported by the IM application, the first participant and the second participant being arranged to engage in the IM session.

3. The method of claim 2 wherein the tool associated with the first participant is a calendar of the first participant, and wherein dynamically granting permissions to enable the second participant to interact with the tool includes allowing the second participant to view the calendar of the first participant using the first application and to interact with the calendar of the first participant.

4. The method of claim 3 wherein dynamically granting permissions that enable the second participant to interact with the tool associated with the first participant includes providing calendar information from the first participant to the second participant and allowing the second participant to modify the calendar information.

5. The method of claim 4 wherein the calendar information is provided to the second participant using the first application.

6. The method of claim 3 wherein dynamically granting permissions to enable the second participant to interact with the tool further includes allowing the second participant to schedule an appointment on the calendar using an interface associated with the first application.

7. The method of claim 6 wherein the appointment is scheduled by sending a scheduling message from the second participant to the first participant.

8. The method of claim 7 wherein the scheduling message is sent using the first application.

9. The method of claim 2 further including:
obtaining permissions that enable the first participant to a calendar associated with the second participant through the first application.

10. The method of claim 1 wherein the first application includes a user interface that allows the tool to be through the first application.

11. A method comprising:
engaging in real-time communications using a first application, the first application executing on at least one computing system, the real-time communications being arranged to involve a plurality of participants, the plurality of participants including a first participant and a second participant, wherein the first application is an instant messaging (IM) application, and wherein engaging in the real-time communications includes engaging in an IM session supported by the IM application, the first participant and the second participant being arranged to engage in the IM session;
dynamically granting permissions that enable the second participant to a tool associated with the first participant, the permissions being dynamically granted using the first application, the tool being arranged to be ed through the first application;
obtaining the permissions that enable the first participant to a calendar associated with the second participant through the first application, wherein the first application is arranged to display the calendar associated with the second participant and a calendar associated with the first participant;
identifying a common time slot with respect to the calendar associated with the first participant and with respect to the calendar associated with the second participant; and
causing an appointment to be scheduled during the common time slot on the calendar associated with the first participant and on the calendar associated with the second participant.

12. The method of claim 11 wherein identifying a common time slot further includes selecting a candidate timeslot, sending a message to the first participant and at least one other participant engaged in the real-time communications, the message being arranged to identify the candidate timeslot, and showing the candidate timeslot using the first application.

13. The method of claim 12 wherein sending the message includes sending the message using the first application.

14. Logic encoded in one or more non-transitory computer-readable storage media for execution and when executed operable to:
engage in real-time communications using a first application, the real-time communications being arranged to involve a plurality of participants, the plurality of participants including a first participant and a second participant, the first application being an instant messaging (IM) application;
determine whether the second participant dynamically grants permissions that enable the first participant to interact with a tool associated with the second participant;
dynamically grant permissions that enable the second participant to interact with a tool associated with the first participant if the second participant dynamically grants the permissions that enable the first participant to the tool associated with the second participant, the permissions that enable the second participant to interact with the tool associated with the first participant being dynamically granted using the first application, the tool associated with the first participant being arranged to be interacted with by the second participant using the first application if the second participant dynamically grants the permissions that enable the first participant to interact with the tool associated with the second participant;
dynamically grant permissions that enable the second participant to view the tool associated with the first participant if the second participant denies the permissions that enable the first participant to the tool associated with the second participant; and
deny the permissions that enable the second participant to interact with the tool associated with the first participant if the second participant denies the permissions that enable the first participant to interact with the tool associated with the second participant.

15. The logic of claim 14 wherein the logic that is operable to engage in the real-time communications includes logic operable to allow the first participant and the second participant to engage in an IM session supported by the IM application.

16. The logic of claim 15 wherein the tool associated with the first participant is a calendar of the first participant, and wherein the logic operable to dynamically grant permissions to enable the second participant to interact with the tool is further operable to allow the second user to view the calendar of the first participant using the first application and to interact with the calendar of the first participant.

17. The logic of claim 16 wherein the logic operable to dynamically grant permissions to enable the second participant to interact with the tool associated with the first participant is further operable to allow the second user to schedule an appointment on the calendar using an interface associated with the first application.

18. The logic of claim 15, wherein the logic is further operable to:
obtain permissions that enable the first participant to a calendar associated with the second participant through the first application.

19. The logic of claim 14 wherein the first application includes a user interface that allows the tool to be through the first application.

20. Logic encoded in one or more non-transitory computer-readable storage media for execution and when executed operable to:
engage in real-time communications using a first application, the first application executing on at least one computing system, the real-time communications being arranged to involve a plurality of participants, the plurality of participants including a first participant and a second participant, wherein the first application is an instant messaging (IM) application, and wherein the logic that is operable to engage in the real-time communications includes logic operable to allow the first participant and the second participant to engage in an IM session supported by the IM application;

dynamically grant permissions that enable the second participant to a tool associated with the first participant, the permissions being dynamically granted using the first application, the tool being arranged to be through the first application;

obtain the permissions that enable the first participant to a calendar associated with the second participant through the first application, wherein the first application is arranged to display the calendar of the second participant and a calendar associated with the first participant;

identify a common time slot with respect to the calendar associated with the first participant and with respect to the calendar associated with the second participant; and cause an appointment to be scheduled during the common time slot on the calendar associated with the first participant and on the calendar associated with the second participant.

21. An apparatus comprising:

means for engaging in real-time communications using a first application, the real-time communications being arranged to involve a plurality of participants, the plurality of participants including a first participant and a second participant, the first application being an instant messaging (IM) application;

means for determining whether the second participant dynamically grants permissions that enable the first participant to interact with a tool associated with the second participant;

means for dynamically granting permissions that enable the second participant to interact with a tool associated with the first participant if the second participant dynamically grants the permissions that enable the first participant to the tool associated with the second participant, the permissions that enable the second participant to interact with the tool associated with the first participant being dynamically granted using the first application, the tool associated with the first participant being arranged to be interacted with by the second participant using the first application if the second participant dynamically grants the permissions that enable the first participant to interact with the tool associated with the second participant; and means for denying the permissions that enable the second participant to interact with the tool associated with the first participant if the second participant denies the permissions that enable the first participant to interact with the tool associated with the second participant.

22. The apparatus of claim 21 wherein the means for engaging in the real-time communications includes means for allowing the first participant and the second participant to engage in an IM session supported by the IM application.

23. The apparatus of claim 22 wherein the tool associated with the first participant is a calendar of the first participant, and wherein the means for dynamically granting permissions to enable the second participant to interact with the tool include means for allowing the second user to view the calendar of the first participant using the first application and to interact with the calendar of the first participant.

24. The apparatus of claim 23 wherein the means for dynamically granting permissions to enable the second participant to interact with the tool further include means for allowing the second user to schedule an appointment on the calendar using an interface associated with the first application using the first application and to interact with the calendar of the first participant.

25. An apparatus comprising:

a real-time communications arrangement, the real-time communications arrangement being arranged to support a real-time communications session that includes a plurality of participants, the plurality of participants including a first participant and a second participant, the real-time communications arrangement including at least one interface; and a first tool, the first tool being associated with the first participant, wherein the real-time communications arrangement is arranged to determine if the second participant has dynamically granted permission that enables the first participant to interact with information associated with a second tool associated with the second participant through the real-time communications session, the real-time communications arrangement further being arranged to enable the first participant to dynamically grant permission that enables the second participant to interact with the information associated with the first tool through the real-time communications session using the at least one interface if it is determined that the second participant has dynamically granted the permission that enables the first participant to interact with the information associated with the second tool, the real-time communications arrangement still further being arranged to dynamically grant permission that enables the second participant to view the information associated with the first tool and to deny permissions that enable the second participant to interact with the first tool if the second participant denies permissions that enable the first participant to interact with the information associated with the second tool.

26. The apparatus of claim 25 wherein the real-time communications arrangement includes a real-time communications application and a tool-sharing arrangement, the tool-sharing arrangement being arranged to allow the second participant to interact with the information associated with the first tool.

27. The apparatus of claim 26 wherein the tool-sharing arrangement is further arranged to allow the second participant to interact with the information associated with the first tool by allowing the second participant to manipulate the information associated with the first tool.

28. The apparatus of claim 26 wherein the real-time communications application is an instant messaging (IM) application, and the real-time communications session is an IM session.

29. The apparatus of claim 28 wherein the first tool is a calendar application, and the information is associated with an availability of the first user for an appointment.

30. The apparatus of claim 29 wherein the tool-sharing arrangement is configured to allow the appointment to be scheduled with respect to the calendar application through the IM session.

* * * * *